United States Patent [19]
Beckley

[11] Patent Number: 5,437,939
[45] Date of Patent: Aug. 1, 1995

[54] SEALED LEAD-ACID BATTERY TRAY ASSEMBLIES AND MOTIVE POWER VEHICLES USING SUCH BATTERY TRAY ASSEMBLIES

[75] Inventor: Gordon C. Beckley, West Chicago, Ill.

[73] Assignee: GNB Industrial Battery Company, Lombard, Ill.

[21] Appl. No.: 178,021

[22] Filed: Jan. 6, 1994

[51] Int. Cl.$^6$ ............... H01M 2/10; B60R 16/04
[52] U.S. Cl. ................. 429/99; 429/100; 180/68.5
[58] Field of Search ............ 429/99, 100, 123; 180/68.5

[56] References Cited

U.S. PATENT DOCUMENTS

| | | | |
|---|---|---|---|
| 2,132,793 | 10/1938 | Kyle | 136/135 |
| 2,548,558 | 4/1951 | Raney | 136/6 |
| 3,664,877 | 5/1972 | Shaw | 136/171 |
| 3,694,729 | 9/1972 | Jones | 307/150 |
| 3,821,997 | 7/1974 | Sieren | 180/68.5 |
| 3,904,439 | 9/1975 | Barrett, Jr. | 136/171 |
| 3,989,544 | 11/1976 | Santo | 429/65 |
| 4,026,378 | 5/1977 | DePriester | 180/68.5 |
| 4,033,424 | 7/1977 | Evans | 180/68.5 |
| 4,109,064 | 8/1978 | Warner et al. | 429/66 |
| 4,275,131 | 6/1981 | Richards | 429/163 |
| 4,401,730 | 8/1983 | Szymborski et al. | 429/53 |
| 4,477,542 | 10/1984 | Braswell | 429/87 |
| 4,582,767 | 4/1986 | Morioka et al. | 429/121 |
| 4,779,692 | 10/1988 | Hagarty et al. | 180/68.5 |
| 4,811,473 | 3/1989 | Link | 29/430 |
| 4,834,424 | 5/1989 | Link | 280/785 |
| 4,957,829 | 9/1990 | Holl | 429/99 |
| 5,017,441 | 5/1991 | Lindner | 429/9 |
| 5,140,744 | 8/1992 | Miller | 29/730 |

OTHER PUBLICATIONS

Barrett Industrial Trucks, Inc., Barrett Industrial Trucks brochure, EWP, Nov. 1992.
Yale Industrial Trucks, Yale Motorized Hand Truck 4000 lb. Capacity brochure, Jan. 1992.
GNB Battery Technologies Industrial Battery Company, Champion State-Of-The-Art Motive Power Sealed Battery Technology brochure, Nov. 1993.

*Primary Examiner*—John S. Maples
*Attorney, Agent, or Firm*—Leydig, Voit & Mayer

[57] ABSTRACT

A sealed lead-acid battery assembly for motive power vehicles is provided for. The battery tray assembly comprises a battery tray having a tray base adapted to support one or more sealed lead-acid batteries. The battery tray has three upstanding tray walls, consisting of two side walls and a front wall, which are connected to the tray base, a tray top connected to the upstanding tray walls, and one or more divider walls. The tray base, side walls, front wall, tray top, and divider wall define one or more compartments adapted to receive batteries and a compartment adapted to receive a battery charger. The battery tray has a generally open back which provides access for loading batteries into the battery compartments and for loading a charger into the charger compartment. Otherwise, the battery and charger compartments are substantially enclosed by the battery tray. The battery tray assembly further comprises a battery charger mounted in the charger compartment, and two or more sealed lead-acid batteries supported in the battery compartments. The batteries are electrically connected together to provide positive and negative termination.

20 Claims, 5 Drawing Sheets

FIG. 1

SEALED LEAD-ACID BATTERY TRAY ASSEMBLIES AND MOTIVE POWER VEHICLES USING SUCH BATTERY TRAY ASSEMBLIES

FIELD OF THE INVENTION

This invention relates to lead-acid batteries and, more particularly, to battery tray assemblies for sealed, maintenance free, lead-acid batteries used in motive powered vehicles.

DESCRIPTION OF THE PRIOR ART

Pallet jacks are very commonly used in shipping and warehousing. Such pallet jacks, also referred to as motorized hand trucks or Class 3 trucks, in essence are a pallet forklift which is operated by a person walking behind the lift. Pallet jacks typically include a chassis on which is mounted drive and lift mechanisms and other operational components. The operational components usually are enclosed in a sheet metal cover. A steering handle is attached to the chassis, and controls for the operational components of the pallet jack typically are mounted on that handle.

Pallet jacks generally are electric powered. In light-duty pallet jacks, the electric power is most commonly supplied by four flooded lead-acid batteries. Thus, light-duty pallet jacks incorporate an assembly for mounting batteries on the pallet jack, as well as a charger which can be used to recharge the batteries.

To date, battery mounting assemblies for light duty pallet jacks have been relatively complicated and costly to manufacture and assemble. For example, one very common design is characterized by pivoting battery shelves. These so-called "swing-out" designs include a lower shelf mounted on the pallet jack. The lower shelf supports two batteries. Two additional shelves are pivotally mounted slightly off-center and above the lower shelf. Each of the upper shelves support a battery, and the upper shelves can be pivoted away from the jack to provide better access to the lower batteries, for example, so that the lower batteries can be watered. A charger is bolted on or about the vertical center line between the batteries. The battery shelves typically have lips to restrict horizontal movement of the batteries, but otherwise, the batteries are either held in place by their own weight or by plastic straps. A cover then is mounted to the pallet jack over the batteries to prevent accidental contact with or damage to the batteries and charger.

There are, however, various disadvantageous with swing-out designs. First, they use flooded batteries which must be watered frequently. If flooded batteries are not maintained properly, and frequently they are not, the battery will fail prematurely. While swing-out designs obviously can accommodate sealed lead-acid batteries which require no maintenance, the design itself is more difficult and costly to build and assemble.

For example, swing-out designs incorporate a relatively large number of separate parts, such as shelves, hinges, supports, hardware, and the cover. The relatively large number of parts increases the cost of manufacturing swing out designs. Further, many of those components must be separately mounted. For example, the lower shelf, swing-out shelves, and charger usually are separately bolted to the pallet jack or to other components of the battery mounting assembly. The batteries then have to be installed and the battery connections made. Finally, the power pack cover is secured to the pallet jack, usually by nuts or bolts, over the batteries and mounting assembly.

Even without the "swing-out" feature, however, conventional battery mounting assemblies are needlessly complicated. The operations need to assemble the battery supports and to install the batteries also are typically performed by the pallet jack OEM at a relatively higher assembly cost.

Moreover, when the pallet jack is in service the charger in some designs is accessible only by removing the cover. This is an inconvenience, and as time passes, the cover may be misplaced and the pallet jack used with the batteries and "live" connections exposed. Some covers incorporate a hinged door allowing access to the charger through the cover, but a hinged access door increases the complexity and cost of the cover.

Further, the plastic straps used to secure the batteries in some designs often are removed or broken during the service life of the batteries. Operating a pallet jack when its batteries are not adequately secured creates an obvious hazard.

An object of the subject invention, therefore, is to provide battery tray assemblies in which batteries and the charger may be securely mounted in a manner which minimizes accidental contact with or damage to the batteries and charger, but which also is more easily and economically manufactured, assembled, and installed. A related and more specific object is to provide such tray assemblies with a minimum number of parts requiring less effort and expense to assemble.

Another object of the subject invention is to provide such battery tray assemblies for sealed lead-acid batteries, thereby eliminating the need for watering batteries once the battery tray assembly is put in service.

It is a further object to provide such battery tray assemblies which allow ready access to the charger controls and power cord.

Yet another object is to provide battery tray assemblies wherein all of the above-mentioned advantages are realized, and to provide pallet jacks which utilize those battery tray assemblies.

Those and other objects and advantages of the invention will be apparent to those skilled in the art upon reading the following description and upon reference to the drawings.

SUMMARY OF THE INVENTION

The subject invention provides for a sealed lead-acid battery tray assembly for motive power vehicles. The battery tray assembly comprises a battery tray having a tray base adapted to support one or more sealed lead-acid batteries. The battery tray has three upstanding tray walls, consisting of two side walls and a front wall, which are connected to the tray base, a tray top connected to the upstanding tray walls, and one or more divider walls. The tray base, side walls, front wall, tray top, and divider wall define one or more compartments adapted to receive batteries and a compartment adapted to receive a battery charger.

The battery tray has a generally open back which provides access for loading batteries into the battery compartments and for loading a charger into the charger compartment. Otherwise, the battery and charger compartments are substantially enclosed by the battery tray.

The battery tray assembly further comprises a battery charger mounted in the charger compartment, and two or more sealed lead-acid batteries supported in the battery compartments. The batteries are electrically connected together to provide positive and negative termination.

Thus, the battery assemblies of the subject invention incorporate in a single unit batteries needed to power motive vehicles and a charger for maintaining the charge of those batteries. The novel battery tray assemblies, as will become apparent from the discussion which follows, also are more easily and economically manufactured, assembled, and installed. In particular, they may be fabricated and assembled by a battery manufacturer and installed as a unit by the vehicle OEM. The novel battery tray assemblies, when installed on a vehicle, require minimal maintenance other than charging of the batteries. The batteries are securely mounted therein in such a manner that, throughout their service life, they remain unexposed to accidental contact by the vehicle operators and are protected from damage caused by dislodgement of the batteries or other accidental impacts.

DETAILED DESCRIPTION OF THE INVENTION

Figure 1:
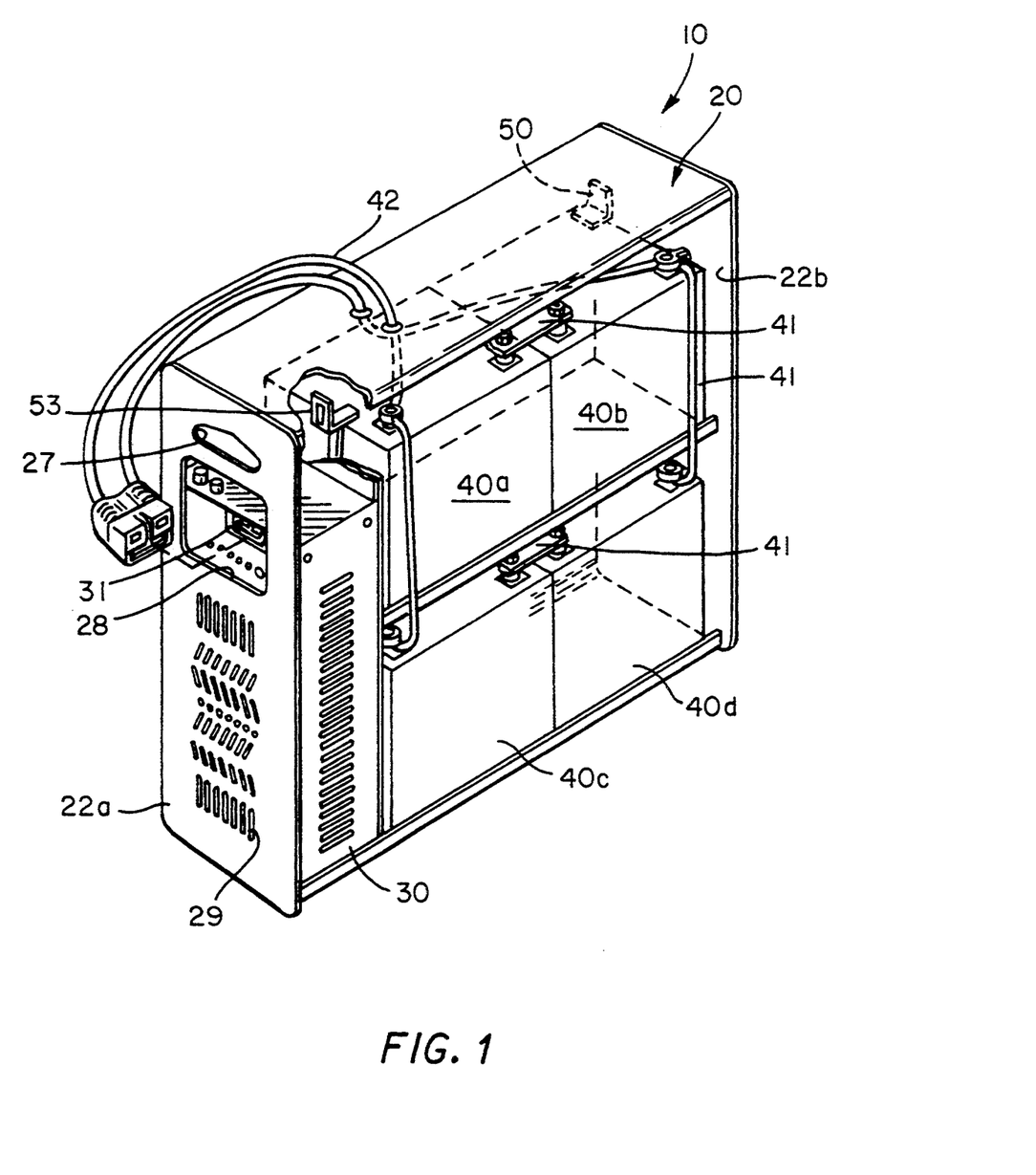
FIG. 1 is a back, top, and right side perspective view of a first preferred embodiment 10 of the battery tray assemblies of the subject invention.

FIG. 1 illustrates a preferred embodiment 10 of the battery tray assemblies of the subject invention. As shown therein, the battery tray assembly 10 comprises a battery tray 20, a charger 30, and four batteries 40a, 40b, 40c, and 40d (collectively 40). The batteries 40 preferably are sealed, valve-regulated, lead-acid batteries which do not require maintenance, and four such 12-volt batteries will provide sufficient power for light-duty pallet trucks. As will be appreciated from the description which follows, however, the battery tray assemblies of the subject invention may incorporate more or fewer than four batteries depending on the power requirements of the vehicle in which the battery tray assemblies will be installed.

The batteries 40 are electrically interconnected via suitable connectors 41 and are in turn connected to a power supply cable 42 by which power may be supplied to a motive vehicle. The cables 42 are centrally located in the assembly so that they will reach more easily to a vehicle's power receptacle regardless of the side on which the receptacle is located. The batteries 40 also are connected to the charger 30 via suitable connections (not shown) so that the batteries 40 may be recharged, and any charger suitable for such purposes may be used in the subject invention.

The electrical connections between the batteries and charger can be made using any desired connectors suitable for such purposes. Many suitable connectors are known. The use of various cables and lead-coated copper connectors are known and have been used. Burned-on connectors, as are employed with flooded lead-acid batteries, also may be used to interconnect the batteries, if desired. Likewise, any suitable power cable may be used to supply power to the motive vehicle, and many such cables are known.

The battery tray assemblies of the subject invention, as noted, include a battery tray. The battery tray is adapted to house and support the charger and batteries in a safe and secure manner, while at the same time allowing easier and more economical fabrication of the battery tray and assembly and installation of the entire unit. To this end, the battery tray includes a tray base adapted to support one or more sealed lead-acid batteries. The battery tray also includes three upstanding tray walls connected to the tray base, the upstanding tray walls consisting of two side walls and a front wall. A tray top is connected to the upstanding tray walls, and the battery tray is provided with one or more divider walls as well. The tray base, side walls, front wall, tray top, and divider walls define one or more compartments adapted to receive batteries and a compartment to receive a battery charger.

Figures 2, 3, 4:
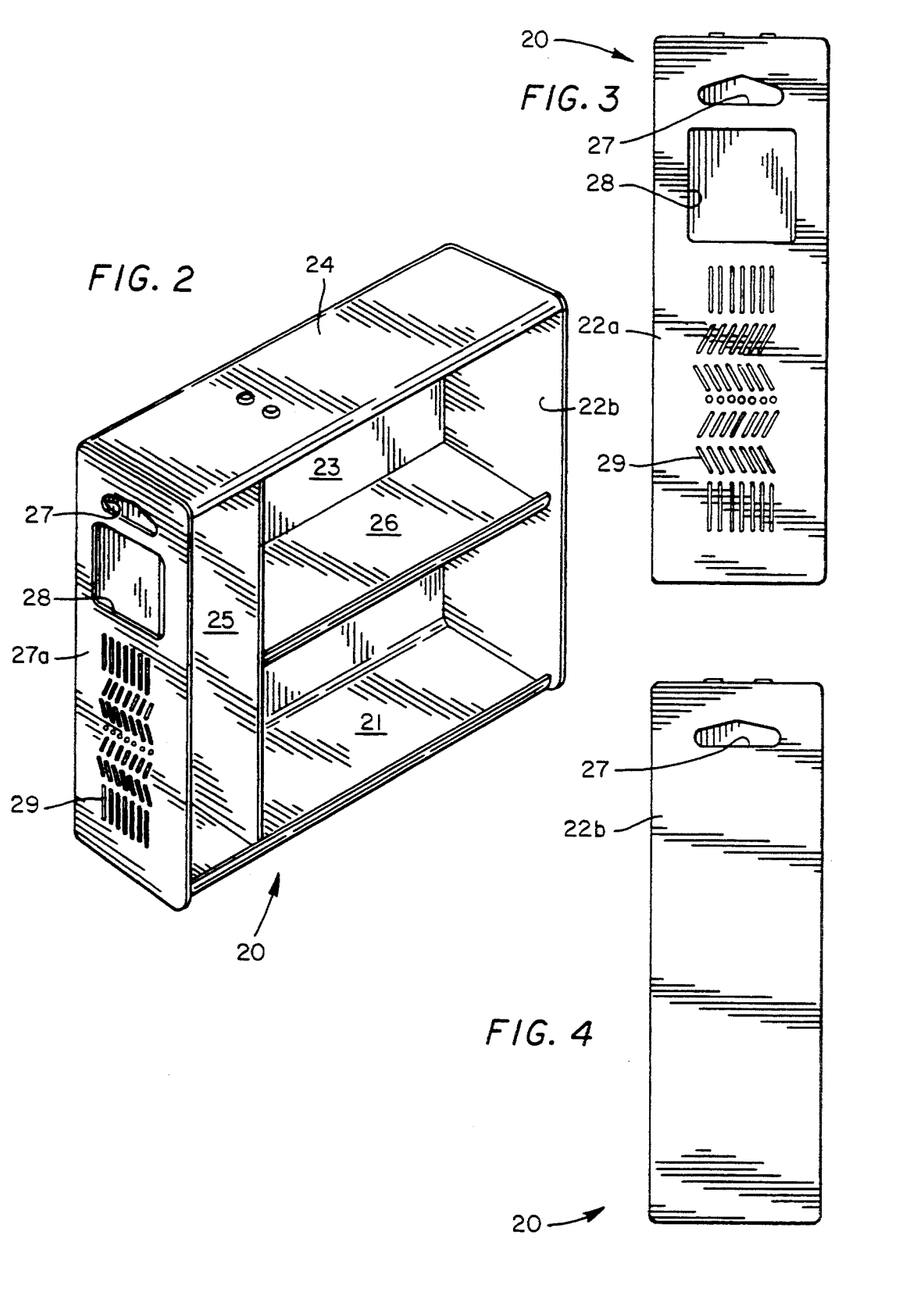
FIG. 2 is a back, top, and right side perspective view of a battery tray 20 incorporated in the battery tray assembly 10 shown in FIG. 1.
FIG. 3 is a right side elevational view of the battery tray 20 shown in FIG. 2.
FIG. 4 is left side elevational view thereof.
Figure 5:
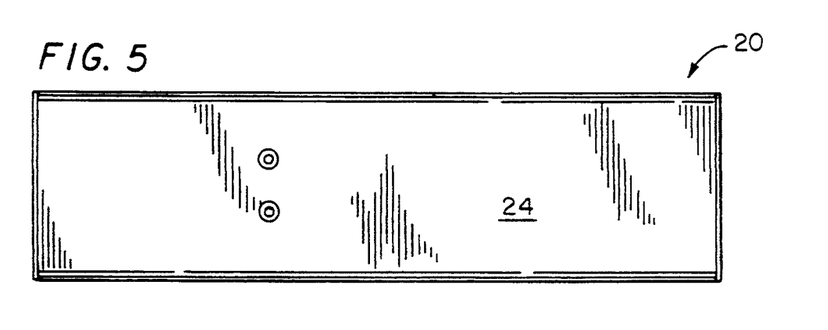
FIG. 5 is a top plan view thereof.
Figure 6:
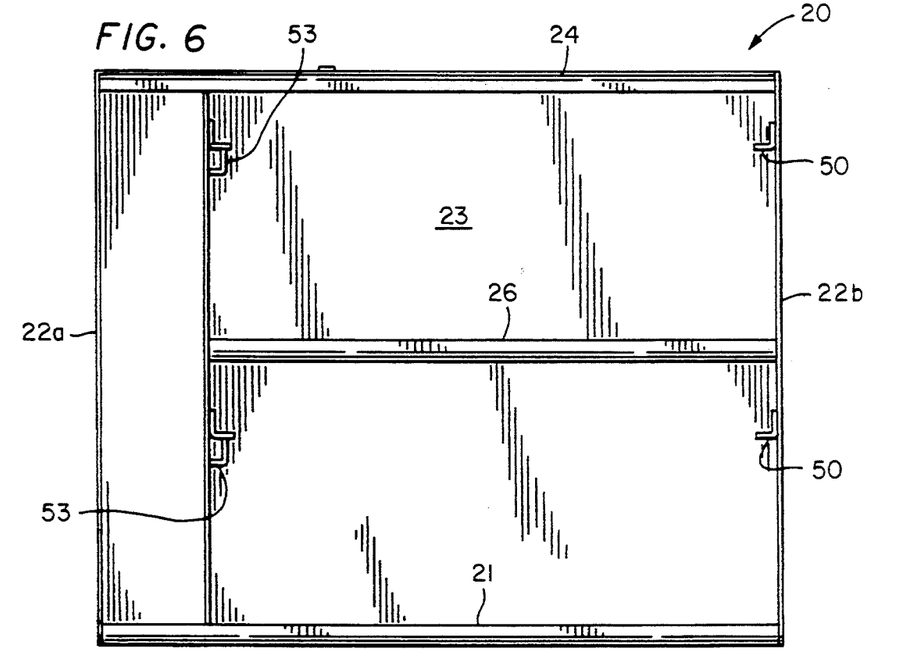
FIG. 6 is a back elevational view thereof.
Figure 7:
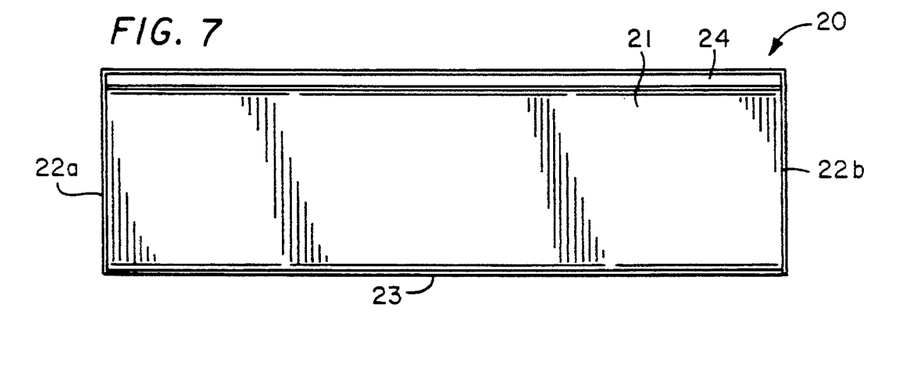
FIG. 7 is a bottom plan view thereof.
Figure 8:
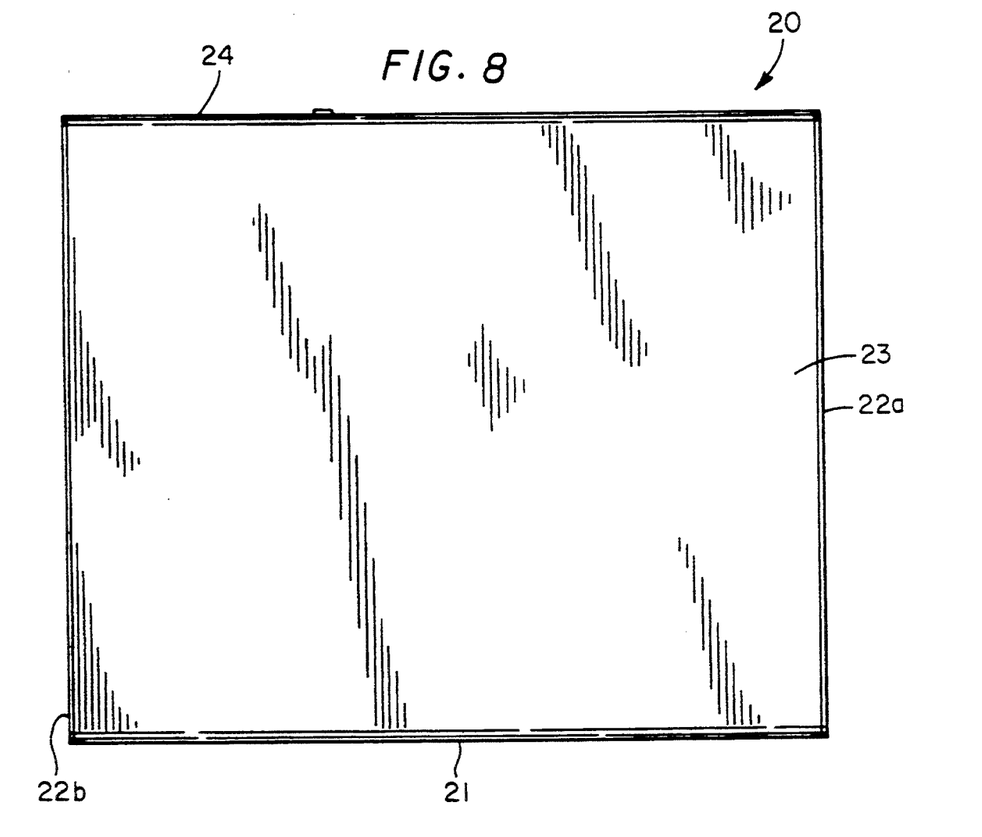
FIG. 8 is a front elevational view thereof.

For example, as can be seen best in FIG. 2, the battery tray 20 includes a base 21. Two side walls 22a and 22b (collectively 22) and a front wall 23 are connected to the base 21, and a top 24 is connected to the side walls 22 and front wall 23. A vertical divider wall 25 extends between the tray base 21 and top 24. A horizontal divider wall or shelf 26 extends between the vertical divider wall 25 and the left side wall 22b.

It will be understood that FIG. 2 is a perspective view which is taken from the back of the battery tray assembly 10. Moreover, the terms "back", "front", "right", "left", and the like are used for convenience and are relative to the orientation of the battery tray assembly 10 when installed, as described below, in a motive vehicle such as a light-duty pallet jack.

The battery tray 20 defines various compartments adapted to receive and support the charger 30, batteries 40, and other components of the battery tray assembly 10. More specifically, the base 21, right side wall 22a, front wall 23, top wall 24, and vertical dividing wall 25 define a compartment in which the charger may be received. The base 21, left side wall 22b, front wall 23, top wall 24, vertical dividing wall 25, and shelf 26 define two battery compartments in each of which two batteries may be received.

The side walls 22 preferably have openings 27 which facilitate lifting and handling of the battery tray assembly 10. One of the upstanding tray walls which define the charger area, in accordance with another preferred feature of the subject invention, is provided with an opening through which the controls to the charger may be accessed. For example, the right side wall 22a of the battery tray assembly 10 is provided with an opening 28, as can be seen best in FIG. 1. It will be appreciated that access to the charger controls may be provided by a hinged door. Such doors offer certain advantages, but do increase the cost of manufacture and assembly of the battery tray. The right side wall 22a also has a number of vent openings 29 by which circulation of air around the charger 30 is facilitated. The precise configuration of the openings 27, 28, and 29, however, are a matter of preference, and any configuration suitable for their respective purposes may be used.

The battery tray may be fabricated from any suitable material. Because of the weight requirements involved, it is desirable to use, for example, sheets of hot rolled steel or commercial quality mild rolled steel having a thickness of about 0.080 to 0.120 inches. The sheet metal can be bent, stamped, and otherwise worked into the desired configuration by conventional metal working machinery. To minimize any corrosion problems in the unlikely event of any leakage or the like, the components may be coated with a liquid epoxy or powder epoxy material. Suitable epoxy materials are well known and have been used in this field for similar purposes. It also may be desirable to mold the tray components from a suitable structural polymer, such as polyvinyl chloride or foamed polypropylene.

Pursuant to yet another aspect of the preferred embodiment of the present invention, the battery tray utilizes a minimum number of components which are designed in a way to facilitate the manufacture of the battery tray. To this end, as can be seen best in FIG. 9, base 21, front wall 23, and top 24 are fabricated from a single sheet of metal. The side walls 22, and divider walls are separately fabricated, for a total of five sheet metal components. Those five components preferably are welded together by conventional equipment, but flanges, openings, and the like my be provided so that the components can be joined by other suitable fasteners such as screws and nuts and bolts. It will be appreciated, therefore, that the battery tray itself, being made of a minimal number of relatively uncomplicated components is easier and more economically manufactured.

Figures 9, 10, 11, 12, 13:
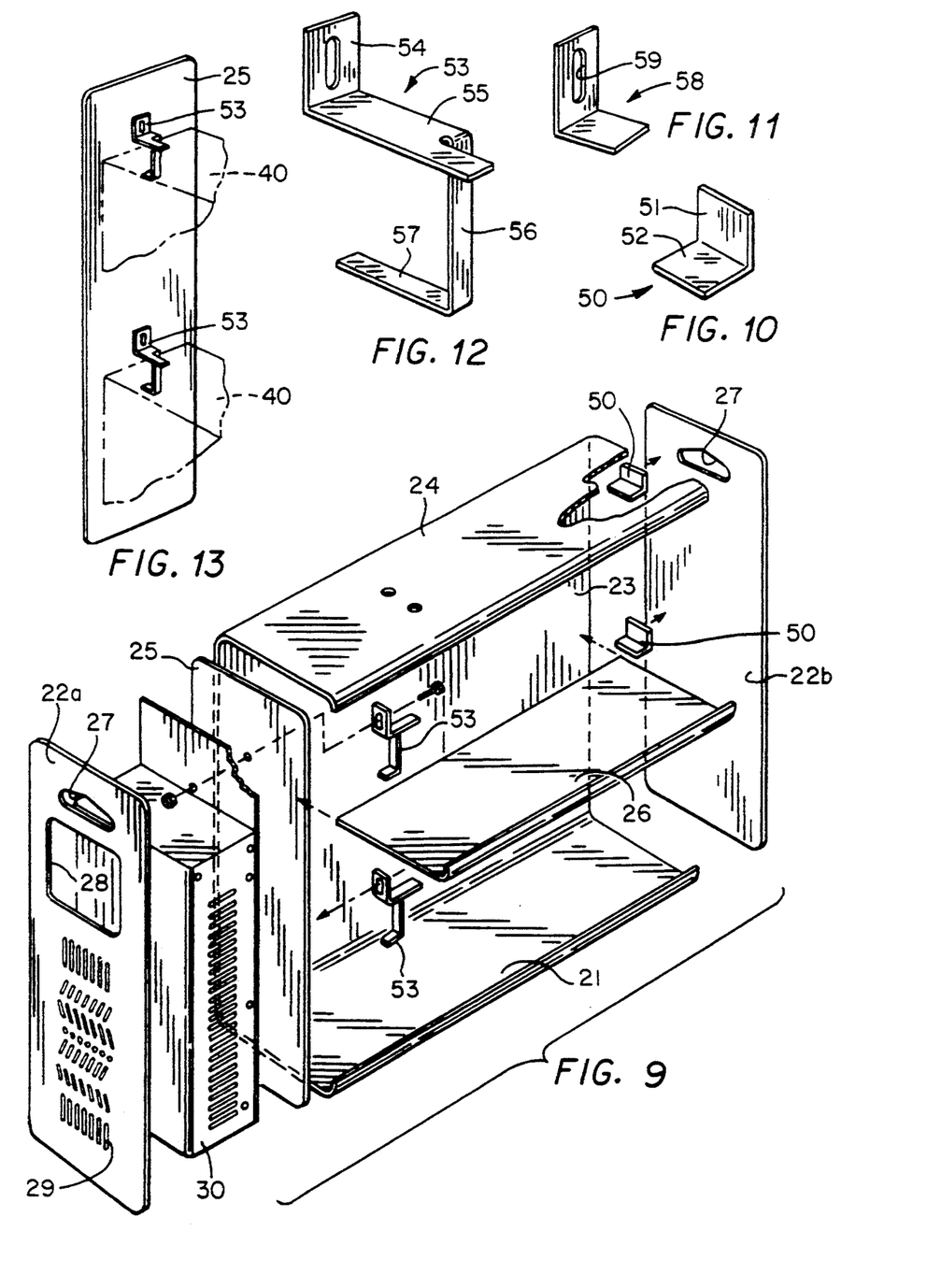
FIG. 9 is an exploded back, top, and right side perspective view of the battery tray assembly 10 shown in FIG. 1, with the batteries and their electrical connections having been omitted for the sake of clarity.
FIG. 10 is a perspective view of a bracket 50 incorporated in the battery tray assembly 10 shown in FIG. 1.
FIG. 11 is a perspective view of an alternate bracket 58 which may be used in the battery tray assembly 10 of FIG. 1.
FIG. 12 is a perspective view of an additional bracket 53 incorporated in the battery tray assembly 10 shown in FIG. 1.
FIG. 13 is a partial perspective view showing brackets 53 as mounted in the battery tray assembly 10 shown in FIG. 1.

In accordance with the subject invention, as can be seen best in FIGS. 1 and 9, the back of the tray is generally open, and the generally open back facilitates assembly of the battery tray assembly by providing easy access for loading batteries and chargers into their respective compartments. More specifically, the open back of the battery tray 20 allows the batteries 40 to easily loaded on the base 21 and shelf 26. The distance between the base 21 and the shelf 26 and between the shelf 26 and top 24 preferably is somewhat greater than the height of the batteries 40 to facilitate loading of the batteries 40, installation of the connections 41, connection of the power cord 42, and assembly of the other components as described below.

Lead-acid batteries, such as batteries 40, are very heavy. Thus, they will not be easily moved by incidental contact to the battery or tray. Preferably, however, the novel battery tray assemblies are adapted to mount the battery securely in place once they are loaded in the batter compartments. For example, the tray base 21 and shelf 26 preferably have a lip projecting upwardly from their back edges. The depth of the tray base 21 and shelf 26 is substantially equal to the width of the batteries 40. That is, the depth of the base 21 and shelf 26 is such that the batteries 40 may be placed thereon with relative ease. Once the batteries 40 are in place, however, the lips serve to prevent significant movement of the batteries back and forth on the base 21 and shelf 26. It will be appreciated, of course, that the lip, although shown as being continuous and relatively short in height, may have other configurations or may be replaced by other suitable restraint means, such as tabs, brackets, clips, and the like.

In other preferred aspects, the width of the battery compartments is coordinated and other means are provided to further restrict movement of the batteries once they are loaded in the battery tray. For example, the battery tray assembly 10 is provided with brackets 50 and 53, one of each being mounted within each battery compartment. Brackets 50, shown in detail in FIG. 10, are L-shaped. A vertical portion 51 of the brackets 50 is welded to the side wall 22b in such a position that a horizontal portion 52 of the brackets 50 rests on or slightly above the batteries 40b, 40d to restrict upward movement thereof, as can be seen in FIG. 1. Such brackets, however, may be mounted by any suitable means. For example, a bracket 58, shown in detail in FIG. 11, which is identical to bracket 50 except for an opening 49, may be used and mounted to the side wall 22b by screws or nuts and bolts.

Brackets 53, shown in detail in FIG. 12, are mounted to the divider wall 25. Brackets 53 may be mounted by any suitable means, but as will become apparent in discussing the manner in which the charger 30 is preferably mounted, brackets 53 preferably are mounted, one in each battery compartment, to the divider wall 25 by bolts which extend through suitable openings in a first vertical portion 54 of the brackets 53 and the divider wall 25. The brackets 53 are mounted at a height equal or slightly greater than the height of the batteries 40a, 40c so that the end of a first horizontal portion 55 of the brackets 53 rests on or slightly above the top surface of the batteries 40a, 40c to restrict the batteries 40a, 40c from upward movement in a manner analogous to brackets 50, as shown best in FIG. 13. A second vertical portion 56 of brackets 53 rests against or is spaced slightly away from the side wall of batteries 40a, 40c so that batteries 40a, 40c are spaced a short, predetermined distance away from the vertical dividing wall 25. A second horizontal portion 57 of brackets 53 reinforces the spacing.

The length of the battery compartment is coordinated such that it is substantially equal to the combined length of two batteries 40 and the predetermined distance which separates batteries 40a, 40c and the vertical dividing wall 25. Thus, brackets 53 and side wall 22b serve to restrict side to side movement of the batteries 40 on the base 21 and shelf 26.

Brackets, such as brackets 53, are preferred not only because they aid in securing the batteries within the battery tray, but also because they create an air space between the vertical dividing wall and the batteries through which air may circulate. Such air circulation can carry away heat which is generated by both the battery and charger as the battery is charged. It is expected, however, that battery tray assemblies without such spacing will provide satisfactory performance insofar as the metal from which the tray is fabricated also tends to carry heat away from the charger and battery. If no spacing is to be provided between the battery and vertical dividing wall a bracket may be provided which simply restrains the battery from upward movement, such as the bracket 58 shown in FIG. 11. The length of the battery compartment preferably would be substantially equal to the combined length of two batteries 40 so that the vertical dividing wall 25 and the side wall 22b serve to restrict side to side movement of the batteries 40.

Moreover, it will be appreciated that the battery mounting assemblies of the subject invention may be adapted to incorporate different sets of brackets mounted in different locations so that a single tray may accommodate batteries having different sizes or configuration of containers. For example, by selectively using brackets 53 or brackets 58, the battery tray assembly 10 can accommodate and secure batteries having containers of different lengths. The same compatibility can be provided by using different sets of brackets 53 differing in the length of their horizontal portions 55 and 57. Similarly, multiple screw holes, or an oval-shaped screw hole as incorporated in brackets 43 and 48, can be provided in the brackets or in the tray to allow mounting of the brackets at different heights so that the tray can accommodate batteries of different heights. There are, therefore, a variety of ways in which the brackets may be configured and various combinations thereof, by which the brackets may be mounted in the battery tray and by which the battery tray may be adapted to accept and secure batteries having different sizes.

As noted above, the generally open back of the tray incorporated into the novel battery tray assemblies also facilitates mounting of the charger and the charger compartment. That is, the charger may be put in place through the open back and mounted in the charger compartment, for example, by nuts and bolts. Preferably, as in the battery tray assembly 10, the same nuts and bolts which are used to secure the brackets 53 to the vertical dividing wall 25 are used to secure the charger 30. It will be appreciated, however, that the charger may be mounted within the charger compartment by screws, straps, clips, or any other suitable means.

In accordance with another preferred feature of the subject invention, it will be appreciated that the upper portion of the charger compartment is not occupied by the charger 30. This portion of the charger compartment may be used as a storage area for the charger power cord (not shown), and the power cord may be withdrawn or replaced through opening 28 which is adjacent thereto. Further, a "dead" male connector 31, that is, a male connector which is not electrically connected, may be mounted on the charger or in the charger compartment so that the power cord 42, when not in use, can be secured thereto.

It will be appreciated that the specific dimensions of the tray used in the subject invention are matter of choice dictated in large part by the dimensions of the batteries to be accommodated and the space limitations imposed by the vehicle on which the battery tray assembly will be installed. In general, however, the dimensions should be coordinated to allow the batteries to be put in place through the open back and interconnected with sufficient ease. At the same time, the dimensions of the battery compartments and the configuration and location of the brackets should be coordinated so that the batteries are immobilized, if not completely at least to the point where it is very difficult for the batteries to become accidentally dumped from the tray.

Figure 14:
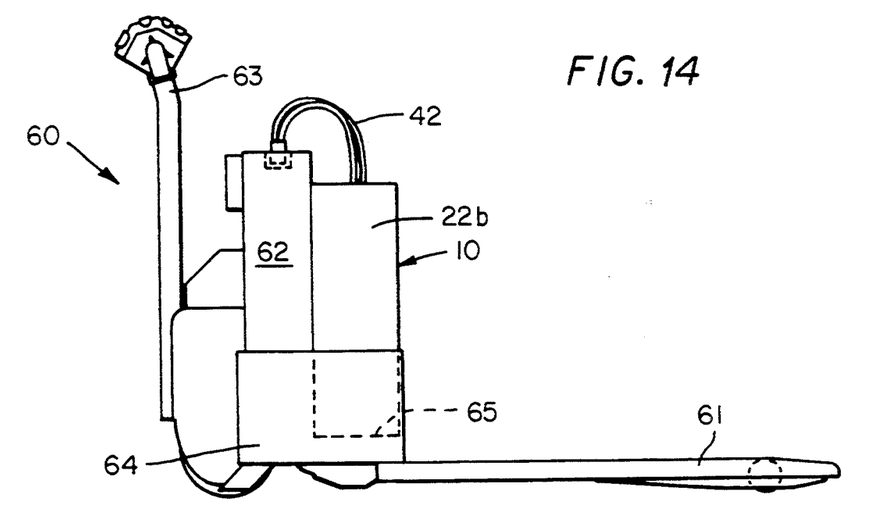
FIG. 14 is a side elevational view of a light duty pallet jack incorporating the battery tray assembly 10 shown in FIG. 1.

The battery tray assemblies of the subject invention may be used to power motive vehicles, such as a light-duty pallet jack 60 shown in FIG. 14. More importantly, the novel battery tray assemblies may be assembled as a unit by a battery manufacturer and then installed as a unit by the vehicle OEM. This is a more economical method of assembly and installation as compared to installation of separate components by the vehicle OEM.

The pallet jack 60 includes lift tongues 61 projecting from the front of the jack and various lift, drive, and other operational components (not shown) which are mounted towards its rear under a cover 62. The operational components are controlled by suitable controls mounted on a handle 63 which extends from the back of the jack and can be manipulated by a vehicle operator.

The components cover 62 substantially encloses the operational components and, together with an apron 64 which extends around the lower portion of the pallet jack 60 defines a well 65 into which the battery tray assemblies 10 may be installed. Given the relative depth of the well 65 and the weight of the battery tray assembly 10, it may not be necessary to otherwise secure the battery tray assembly 10 to the pallet jack 60. It is preferable, however, especially when the pallet jack has a shallow well or nothing other than a support surface, that the battery tray assembly be secured in some manner, for example by nuts and bolts, to the vehicle.

As can be seen in FIG. 14, the battery tray assembly 10 is installed against or closely adjacent to the components cover 62. Thus, despite the fact that the battery tray 20 has an open back, since the battery compartment and charger compartment are otherwise substantially enclosed, the battery tray assembly provides both protection for and necessary access to the assembly components. That is, via the opening 28 the charger 30 and its power cord are readily accessible. At the same time, the charger 30 is enclosed in the charger compartment by the adjacent face of the component cover 62 and protected against damage caused by objects which might otherwise impact it during service. The batteries 40 are likewise enclosed, thereby avoiding damage to the battery and injury to vehicle operators who otherwise might be injured by exposed batteries.

In accordance with another preferred aspect of the invention, it will be noted, especially by reference to FIG. 2, that the depth of the tray top 24 is greater than the depth of the tray base 21 and shelf 26. When the battery tray assembly 10 is installed against the component cover 62 of the pallet jack 60, therefore, internal clearance is created between the component cover 62 and the tray base 21 and shelf 26. This clearance allows space for the connection cables 41 and allows air circulation through the various tray compartments.

From the foregoing, therefore, it can be seen that the battery tray assemblies of the subject invention offer significant advantages to battery manufacturers, vehicle OEMs, and vehicle operators. As noted, the novel battery trays have relatively fewer parts and those parts have relatively simple designs. Thus, the battery trays are easily manufactured. Because the battery trays have an open back, the batteries and charger are very easily loaded and mounted. Moreover, the same battery tray can be made to accommodate batteries of various sizes by the appropriate use of brackets.

The novel battery tray assemblies also offer various advantages over prior art designs which must be assembled by the vehicle OEM from various parts. The vehicle OEM can install the novel battery tray assemblies as a unit with very little effort. Once installed, the battery tray assemblies provide the vehicle with all power related components.

Vehicle operators also realize significant advantages from the novel battery tray assemblies. For example, watering of the batteries is not needed. The only periodic maintenance is charging of the batteries, and charging is easy because the controls and power cord are readily accessible. At the same time, operators are protected from the hazards of exposed battery connections. The battery trays, though having an open back which facilitates assembly of the unit, are "enclosed" by the vehicle component cover. The tray does not have to be removed to charge the battery and, in fact, cannot be removed without removing the batteries as well. Thus, there is no risk that the vehicle will be operated with exposed batteries.

This invention has been disclosed and discussed primarily in terms of specification embodiments thereof. It is not intended, however, to be limited thereto. For example, the battery tray may be provided with an additional vertical divider wall such that the charger compartment is disposed in the center of the tray between the battery compartments. Other modifications and embodiments will be apparent to the worker in the art.

I claim:

1. A sealed lead-acid battery tray assembly for motive powered vehicles which comprises:
    a battery tray including a tray base to support one or more sealed lead-acid batteries, three upstanding tray walls connected to the tray base, the upstanding tray walls consisting of two side walls and a front wall, a tray top connected to the upstanding tray walls, and one or more divider walls, the tray base, side walls, front wall, tray top, and divider walls defining one or more compartments to receive batteries and a compartment to receive a battery charger, the battery tray having a generally open back providing access for loading batteries into the battery compartments and loading a charger into the charger compartment, the battery and charger compartments being otherwise substantially enclosed by the battery tray;
    a battery charger mounted in the charger compartment; and
    two or more sealed lead-acid batteries supported in the battery compartments and electrically connected together to provide positive and negative termination.

2. The sealed lead-acid battery tray assembly of claim 1, wherein the divider walls include a vertical divider wall and wherein the charger compartment is defined by the vertical divider wall, front wall, tray base, tray top, and one of the side walls.

3. The sealed lead-acid battery tray assembly of claim 2, wherein the divider walls include a horizontal shelf to support one or more batteries and wherein the battery tray has two battery compartments defined by the horizontal shelf, front wall, tray base, tray top, vertical divider wall, and the other side wall.

4. The sealed lead-acid battery tray assembly of claim 1, wherein the depth of the tray top is greater than the depth of the tray base.

5. The sealed lead-acid battery tray assembly of claim 3, wherein the depth of the tray top is greater than the depth of the horizontal shelf.

6. The battery tray assembly of claim 1, wherein one of the tray walls defining the charger compartment has an access opening to allow access to controls of the charger mounted therein.

7. The battery tray assembly of claim 1, wherein a portion of the charger compartment is available for storing a power cord of the charger mounted therein and one of the tray walls defining the charger area has an opening adjacent to the power cord storage portion adapted to allow withdrawal and replacement of the power cord therein.

8. The battery tray assembly of claim 1, wherein the tray base has a lip projecting upwardly from the back edge thereof, the depth of the tray base being substantially equal to the width of a battery supported thereon.

9. The battery tray assembly of claim 3, wherein the horizontal shelf has a lip projecting upwardly from the back edge thereof, the depth of the horizontal shelf being substantially equal to the width of a battery supported thereon.

10. The battery tray assembly of claim 1, wherein the width of the battery compartments is substantially equal to the combined length of the batteries supported therein.

11. The battery tray assembly of claim 3, wherein the width of the battery compartments is substantially equal to the combined length of two batteries.

12. The battery tray assembly of claim 1, wherein the battery tray assembly comprises one or more brackets mounted within the battery compartments to restrict upward movement of batteries supported in the battery compartments.

13. The battery tray assembly of claim 3, wherein the battery tray assembly comprises one or more brackets mounted within the battery compartment on the vertical divider wall and the side wall defining the battery compartments, the brackets restricting upward movement of batteries supported in the battery compartments.

14. The battery tray assembly of claim 3, wherein the battery tray assembly includes one or more brackets mounted within the battery compartments on the vertical divider wall and the side wall defining the battery compartments, the brackets restricting upward movement of the batteries supported in the battery compartments and at least one of the brackets spacing one of the batteries from the vertical divider wall or side wall, wherein the width of the battery compartment is substantially equal to the combined length of two batteries and the space from the vertical divider wall or side wall.

15. The battery tray assembly of claim 1, wherein the tray base, front wall, and tray top are fabricated from a single sheet of metal.

16. A motive-powered vehicle which comprises a battery receptacle area, the battery tray assembly of claim 1 mounted on the battery receptacle area, and connectors for accepting the positive and negative termination from the battery tray assembly.

17. A motive-powered vehicle which comprises the battery tray assembly of claim 2 and connectors for accepting the positive and negative termination from the battery tray assembly.

18. A motive-powered vehicle which comprises the battery tray assembly of claim 3 and connectors for accepting the positive and negative termination from the battery tray assembly.

19. A motive-powered vehicle which comprises the battery tray assembly of claim 4 and connectors for accepting the positive and negative termination from the battery tray assembly.

20. A motive-powered vehicle which comprises the battery tray assembly of claim 5 and connectors for accepting the positive and negative termination from the battery tray assembly.

* * * * *

UNITED STATES PATENT AND TRADEMARK OFFICE
CERTIFICATE OF CORRECTION

PATENT NO. : 5,437,939
DATED : August 1, 1995
INVENTOR(S) : Gordon C. Beckley

It is certified that error appears in the above-indentified patent and that said Letters Patent is hereby corrected as shown below:

Column 5, line 42, delete "my" and substitute therefor -- may --;

Column 6, line 28, delete "49" and substitute therefor -- 59 --; and

Column 7, line 22, delete "43 and 48" and substitute therefor -- 53 and 58 --.

Signed and Sealed this

Nineteenth Day of December, 1995

Attest:

BRUCE LEHMAN

Attesting Officer

Commissioner of Patents and Trademarks